(12) United States Patent
Van Wyck Gould et al.

(10) Patent No.: US 8,862,680 B2
(45) Date of Patent: Oct. 14, 2014

(54) METHODS AND SYSTEMS FOR DATA PRIORITIZATION

(75) Inventors: Kim Van Wyck Gould, Seattle, WA (US); Gregory J. Small, Federal Way, WA (US); Steven R. Galipeau, Redmond, WA (US); Carey J. Kirkland, Edgewood, WA (US)

(73) Assignee: The Boeing Company, Chicago, IL (US)

( * ) Notice: Subject to any disclaimer, the term of this patent is extended or adjusted under 35 U.S.C. 154(b) by 1804 days.

(21) Appl. No.: 11/381,066

(22) Filed: May 1, 2006

(65) Prior Publication Data

US 2007/0255850 A1   Nov. 1, 2007

(51) Int. Cl.
  *G06F 15/16* (2006.01)
  *G08G 5/00* (2006.01)
  *H04L 29/08* (2006.01)

(52) U.S. Cl.
  CPC ............ *H04L 67/322* (2013.01); *G08G 5/0026* (2013.01); *H04L 67/325* (2013.01)
  USPC .......................................... 709/207; 709/206

(58) Field of Classification Search
  USPC ................................................. 709/204–207
  See application file for complete search history.

(56) References Cited

U.S. PATENT DOCUMENTS

| | | | |
|---|---|---|---|
| 4,965,716 A * | 10/1990 | Sweeney ........................ 710/112 |
| 5,522,026 A * | 5/1996 | Records et al. ................. 715/710 |
| 6,073,142 A | 6/2000 | Geiger et al. |
| 6,088,720 A | 7/2000 | Berkowitz et al. |
| 6,161,130 A | 12/2000 | Horvitz et al. |
| 6,182,059 B1 | 1/2001 | Angotti et al. |
| 6,192,360 B1 | 2/2001 | Dumais et al. |
| 6,266,322 B1 | 7/2001 | Berger et al. |
| 6,499,078 B1 * | 12/2002 | Beckert et al. ................. 710/260 |
| 6,622,160 B1 | 9/2003 | Horvitz |
| 6,714,967 B1 | 3/2004 | Horvitz |
| 6,721,784 B1 | 4/2004 | Leonard et al. |
| 6,813,522 B1 * | 11/2004 | Schwarm et al. .................. 700/5 |
| 6,938,024 B1 | 8/2005 | Horvitz |
| 7,051,284 B2 * | 5/2006 | Uemura et al. ................ 715/752 |
| 7,346,007 B2 * | 3/2008 | Curcio et al. .................. 370/252 |
| 2002/0073238 A1 * | 6/2002 | Doron ........................... 709/246 |
| 2003/0065428 A1 * | 4/2003 | Mendelson et al. .............. 701/9 |
| 2003/0149839 A1 * | 8/2003 | Kuwata .......................... 711/113 |
| 2004/0001491 A1 * | 1/2004 | Ruutu et al. ................. 370/395.4 |
| 2006/0002416 A1 * | 1/2006 | Yagihashi ....................... 370/428 |
| 2006/0146875 A1 * | 7/2006 | Yang ............................ 370/468 |
| 2007/0121499 A1 * | 5/2007 | Pal et al. ....................... 370/230 |
| 2008/0019492 A1 * | 1/2008 | Jyoti ......................... 379/100.01 |
| 2008/0165713 A1 * | 7/2008 | Nishibayashi et al. ....... 370/310 |
| 2008/0170499 A1 * | 7/2008 | Cozens et al. ............. 370/230.1 |
| 2008/0240156 A1 * | 10/2008 | Elliot et al. ................... 370/468 |

* cited by examiner

*Primary Examiner* — Joseph E Avellino
*Assistant Examiner* — James Baron
(74) *Attorney, Agent, or Firm* — Armstrong Teasdale LLP

(57) ABSTRACT

Methods and systems for data prioritization are described. In one example embodiment, the method includes the steps of assigning data an urgency and importance, and prioritizing the data using the assigned urgency and importance. In one specific example, such prioritization is then used in communicating, e.g., dispatching, the data. For example, such urgency and importance are used in prioritizing data to be communicated between an onboard aircraft system and a ground based system.

27 Claims, 13 Drawing Sheets

For Small Messages:

|  | Importance Low | Importance High |
|---|---|---|
| Urgency High | • Send if latency requirement can be met, as 2nd priority.<br>• Use any available communications link. | • Send ahead of all others as first priority.<br>• Use any available communications link. |
| Urgency Low | • Send after small messages from all other quadrants (4th priority).<br>• Use any available communications link. | • Send as 3rd priority.<br>• Use any available communications link. |

For Large Messages:

|  | Importance Low | Importance High |
|---|---|---|
| Urgency High | • Send if latency requirements can be met, which in turn requires adequate bandwidth to be available (otherwise don't waste the resource).<br>• Interleave or interrupt in favor of small messages without impacting their latency, or higher priority large messages.<br>• Only use lowest-cost communications links. | • Send ahead of all other large messages.<br>• Interleave with small messages without impacting their latency.<br>• Use almost any available communications link. |
| Urgency Low | • Send after large messages from all other quadrants (5th priority).<br>• Interleave or interrupt in favor of all other messages.<br>• Delay until communications link available with adequate bandwidth and lowest-cost. | • Interleave or interrupt in favor of small messages without impacting their latency.<br>• Delay until communications link available with adequate bandwidth and acceptably-low cost. |

FIG. 4

METHODS AND SYSTEMS FOR DATA PRIORITIZATION

BACKGROUND OF THE INVENTION

This invention relates generally to communications between an aircraft and ground systems and, more particularly, relates to assigning data a priority for further processing.

Communication between an aircraft and ground system sometimes is referred to herein as Aircraft/Ground Systems Communications (AGSC). As used herein, the term aircraft refers to airplanes, helicopters, missiles, and any object capable of flight. Such communications are not limited to communications when the aircraft is in the air, but also includes communication when the aircraft is on the ground. In addition, AGSC generally is bidirectional between the aircraft and ground.

AGSC traditionally are based on transmission of small messages that support aircraft and flight operations. Demand for additional communication channels and data transfer needs, however, is driving rapid change in connection with such communications. For example, with respect to airplanes, such airplanes are becoming increasingly connected through distributed systems relying on integrated information spanning each airplane and ground. The AGSC provides the right information to the right people at the right time for better decision making in an environment of rapidly increasing demand for information. Such increased demand is due, for example, to increasing reliance by ground systems upon real time operational data from the aircraft, as well as increased communication needs of the flight crew, cabin crew and passengers. Further, in addition to messaging, there are applications in which large data files are transferred between air and ground using file transfer techniques rather than messaging.

Satellite, ground-based wireless, data-over-cellular, and other communication techniques, utilizing a variety of protocols including Internet Protocol (IP) can, for example, be utilized for AGSC. Providing sufficient channels for the increasing volume of data traffic is challenging. In addition, message diversity (e.g., message size) along with an increasing number of applications producing and consuming data in support of a wide range of business processes puts additional demand on the communication channels. Communications channels have different costs associated with them for data transfer, depending on the service provider, global location and other factors.

A known approach for handling message priority assigns priority on a linear scale, e.g., 1 through 5. For example, messages with a priority "1" are delivered ahead of those messages with a priority "2", and so on. Such linear scales are too simplistic to properly address the range of data communications needs of the different applications communicating with one another in support of diverse business processes. The challenge is to meet these different data communications needs in the presence of complex constraints and alternatives in the communications infrastructure. For example, if some data is very important but will not be utilized by the consuming application for 24 hours, the delivery of such important data can be completed any time before then, allowing the data to be assigned a lower priority. This provides the flexibility to deliver other data ahead of such important data, and defer delivery of such important data until a high-bandwidth, lower cost option is available. But if delivery of such important data has not been completed as the 24 hour deadline approaches, a linear priority does not take into account the increasing urgency of having to deliver this data, possibly using more expensive delivery choices. Other needs may be associated with other data, e.g., immediate delivery no matter what the cost, or deleted within a short period of time.

BRIEF DESCRIPTION OF THE INVENTION

In one aspect, a system for aircraft/ground systems communications is described. The system includes a processor based onboard the aircraft, a ground based processor, and at least one of the onboard processor and ground based processor are programmed to assign an urgency and an importance to data to be transmitted.

In another aspect, a system is described. The system includes a memory for storing data, and a processor coupled to the memory. The processor is programmed to assign an urgency and an importance to data.

In yet another aspect, a method for processing data is described. The method includes the steps of assigning an urgency and an importance to the data, and further processing the data based on the assigned urgency and importance.

In still yet another aspect, a processor is described. The processor is programmed to assign an urgency and an importance to data, and further process the data based on the assigned urgency and importance.

In another aspect, a system is described. The system includes a memory for storing data, and a processor coupled to the memory. The processor is programmed to assign at least a first parameter and a second parameter to the data, and to utilize the parameters to assign a priority to the data.

In yet another aspect, a method for responding to a request for data is described. The method includes receiving, at a responder, a request for data. The request includes a requester-determined urgency and importance associated with the data. The method further includes generating, at the responder, a response based on at least one of the requester-determined urgency and importance and a responder-determined urgency and importance.

In still yet another aspect, a method for providing data to a subscriber is described. A publisher provides data to a publication function, and a subscription/publication management function is coupled to the publication function. The method includes the step of receiving, at the subscription/publication management function, a request for data, the request including a subscriber determined urgency and importance. The method further includes the subscription/publication management function causing the requested data to be sent to the subscriber from the publication function based on at least one of the subscriber determined urgency and importance and a subscription/publication management function determined urgency and importance.

In another aspect, a method for responding to a data request from an application is described. The method includes receiving, at a first application, a request for data. The request includes a second application-determined urgency and importance associated with the data. The method further includes generating, at the first application, a response based on at least one of the second application-determined urgency and importance and a first application-determined urgency and importance.

BRIEF DESCRIPTION OF THE DRAWINGS

FIG. 4 illustrates processing of small and large messages in connection with a two dimensional priority involving importance and urgency.

DETAILED DESCRIPTION OF THE INVENTION

Figure 1:
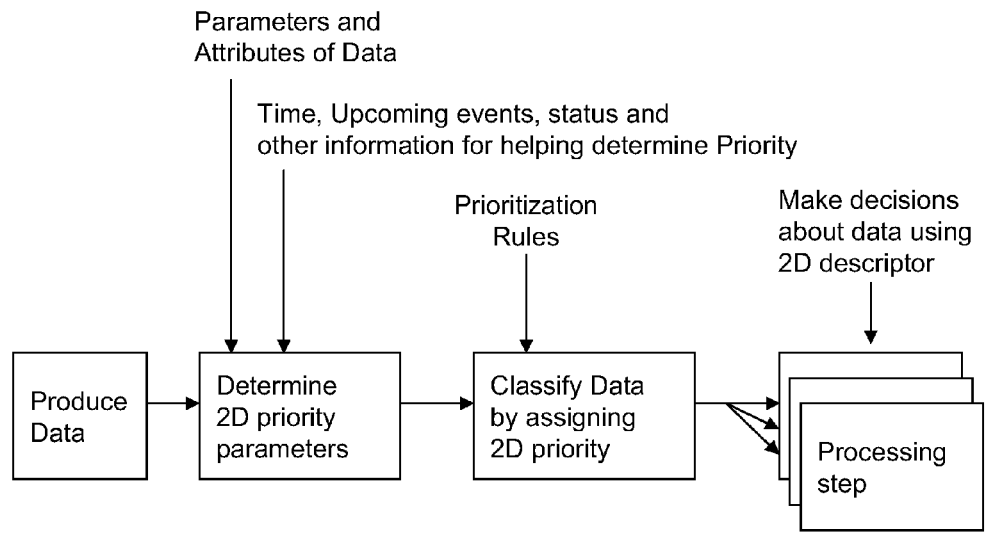
FIG. 1 is a flow diagram illustrating generation and utilization of a two dimensional priority scheme.

The present methods and systems are sometimes described herein in the context of aircraft/ground communications. Such methods and systems, however, are not limited to use in such communications, and can be used in many other contexts. Generally, such methods and systems can be utilized in connection with any application in which data is to be prioritized. For example, such prioritization can be used in dispatching data (e.g., in a message, a file, or any other type of format), in further processing of the data, and in other applications.

The terms "data", "message", and "file" are sometimes used herein interchangeably, and each of those terms broadly refer to information in any format. For example, certain types of messages include a wrapper with meta-data related to the message. Since a message is delivered via a messaging system, the meta-data is required to allow the messaging system to process the message. Meta data can be part of a message or handled separately. Alternatively, meta data can be generated by the processor, used for decision making, and then discarded (i.e., the meta data is never included in the message). A file typically includes just data. As used herein, however, the terms data, message and file are generally used interchangeably, and the invention applies to data in file based, messaged based, and any other format.

The term "user", as used herein, includes a human operator, as well as systems and applications. Therefore, the term user is not limited to being a human, and in many instances references a system or application that includes software operating on a processor.

Also, as used herein, the term "processor" refers to a digital processor, an analog processor, as well as any analog and digital circuit as well as software, including combinations thereof, capable of performing the described functions. For example, the processor could be a microprocessor, a computer, an analog circuit, a combination analog and digital circuit, a server (e.g., an e-mail server, a general purpose server), an integrated circuit, software, and any combination of the foregoing. Also, the described processing need not be performed by a single processor, but could be performed across more than processor.

Further, the data referred to herein is sometimes described as being generated or originated by a "sender", which could be a hardware or software system or application, and received and/or processed by a "receiver", which could also be a hardware or software system or application. The term "producer" is sometimes used herein to refer to a sender generally involved in generating and sending data in a simple pattern to one or more receivers, where the receiver(s) are usually referred to in this simple pattern as "consumer(s)". The term "requester" is used to refer to a sender that is expecting a response from a receiver, and the receiver in this request/response pattern is generally referred to herein as the "responder". The term "publisher" is sometimes used herein to refer to a sender that generates data for one or more receivers by publishing its data. The receiver(s) in this pattern are referred to as "subscriber(s)". An announcement function provides a mechanism to allow subscribers to learn about and receive the data generated by the publisher. However, the term producer is also used interchangeably with sender as a generic sender, and the term consumer is also used interchangeably with receiver as a generic receiver.

FIG. 1 is a flow diagram illustrating generation and utilization of a two dimensional (2D) priority scheme. Generally, and in one aspect, two dimensional priority refers to a representation of priority of data, where the representation is abstracted from the business process that produces the data or that is otherwise associated with the data. The two dimensional priority is abstracted from the specific parameters and attributes of the data that are needed to derive or classify the data priority. The prioritization also may take into account the time, upcoming events, status and other information. Such prioritization can be implemented, for example, in a rule based system. Examples of parameters and attributes taken into account in connection with prioritization include action, time/event, consequence(s), and significance of consequence(s). Once a priority is assigned to the data, then the data can be classified by the assigned 2D priority, and such 2D priority (e.g., as represented in a descriptor) can be utilized in further processing steps.

The 2D priority descriptor described herein, in an example embodiment, is for use with data and represents, in an example embodiment, a 2 dimensional vector quantity of urgency and importance. The 2D priority descriptor is used, for example, in making decisions when faced with constrained resources or alternative choices. Decisions revolve, for example, around the activities of dispatching, subscribing, consuming, storing and processing. Of course, parameters other than or in addition to urgency and importance can be utilized, as described below in more detail.

Such 2D representation provides several advantages. For example, such 2D representation is a simple, standardized and consistent way to classify disparate data in a system. Such classification of data facilitates fully-informed decisions to be made about the data when further processing is performed without having to be aware of the specifics of the business process, or events, or parameters that were used to derive the 2D value. In addition, the business process information and data associated with such information can be contained within the producer, which facilitates privacy and security of information. Generally, the parameters selected for such representation meet the criteria of being independent variables and providing full coverage of the data space of interest. By utilizing independent variables, information is maximized and process step decision making is simplified.

2D prioritization has particular usefulness when applied to application messaging in an extended enterprise/multi-enterprise environment. Of course, and as explained and illustrated below in more detail, such 2D prioritization can be used in many other contexts as well and is not limited to the specific applications set forth herein.

Figure 2:
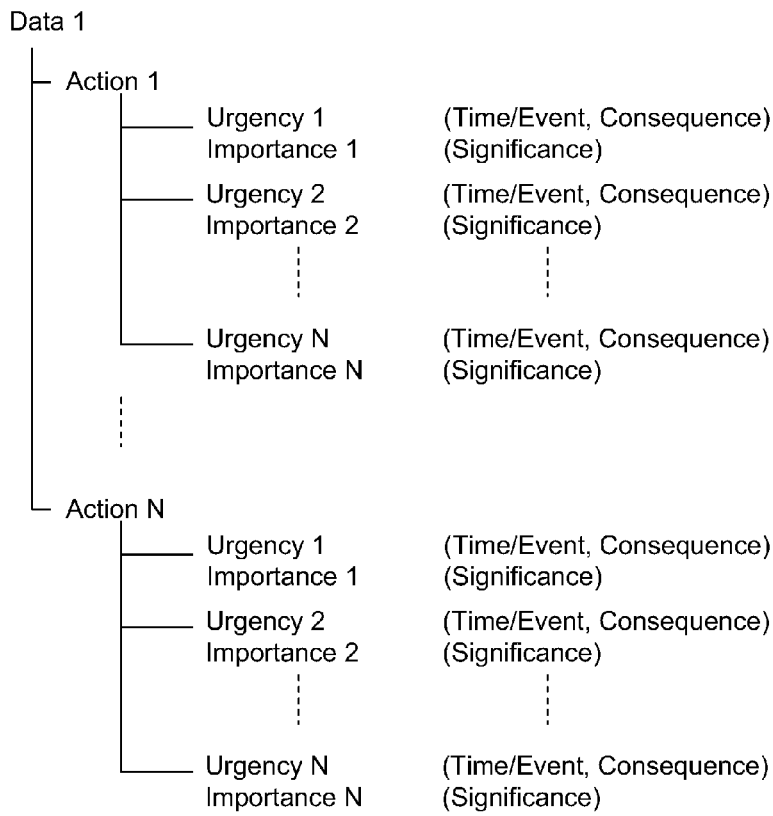
FIG. 2 illustrates utilization of urgency and importance in connection with action determination.

In the examples set forth herein, priority typically is represented as urgency and importance, as illustrated in FIG. 2. FIG. 2 illustrates utilization of urgency and importance in connection with action determination. Urgency typically refers to how quickly the usefulness of the data deteriorates, and/or how quickly a response to the data is required, and/or a need to have the data arrive prior to an event, and/or a need for promptness of action. Importance typically refers to a degree to which the data will alter or enhance a significant decision, and/or a degree to which the data will cause a significant event, and/or an impact if the data is not delivered.

With reference to urgency and importance, the meaning of consequence generally refers to a result, not importance. Also, note that 'not done' can mean 'not done at all' (for which there is one consequence), or 'done, but not done by the time or event deadline' (for which there would be another consequence).

While urgency and importance are generally described herein as having one of two values (i.e., high or low), such values could be a range (e.g., a scale of 1-5). In addition, urgency and importance are sometimes described herein in the context of a 2×2 matrix. Such matrix could, instead, be a 3×3 matrix (e.g., hi/med/lo). In addition, rather than just 2D, additional parameters can be used so that three dimensions or more are captured. Therefore, the term 2D as used herein refers to two or more dimensions, and is not limited to mean only two dimensions.

Figure 3:
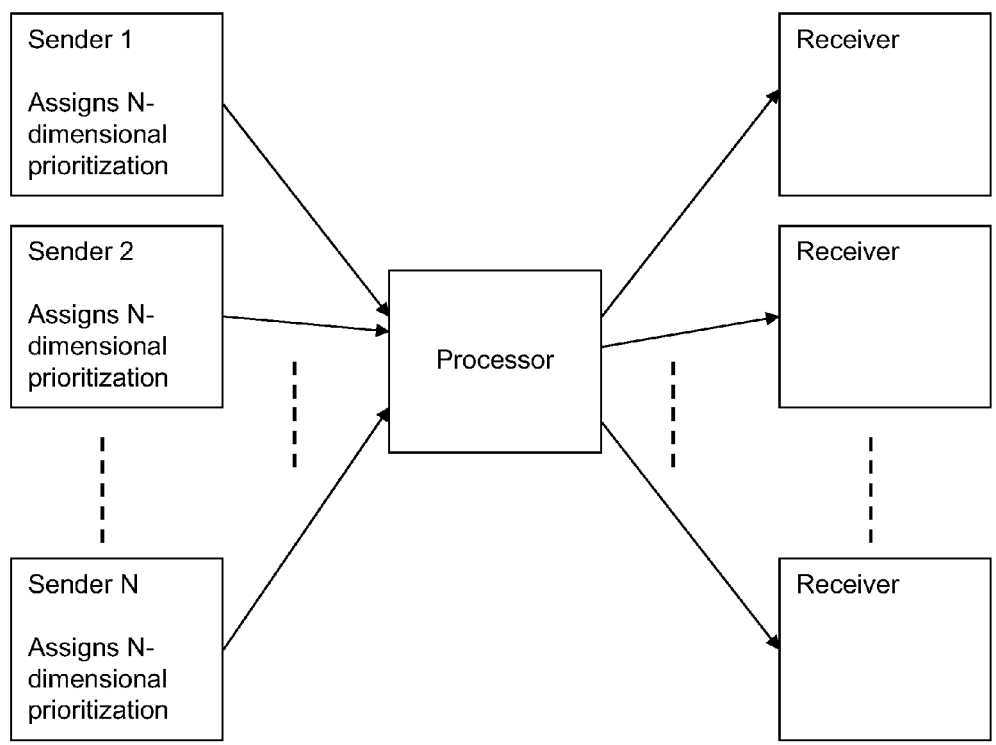
FIG. 3 is a schematic illustration of multiple senders providing data, assigned a priority, to a processor that, in turn provides data to multiple receivers.

FIG. 3 is a schematic illustration of multiple senders providing data which have been assigned a priority to a processor that, in turn provides data to multiple receivers. As shown in FIG. 3, each sender (i.e., Sender 1 to Sender N) assigns an N-dimensional priority to data. As used herein, the term "N-dimensional" refers to two or more dimensions. That is, in one aspect, the present prioritization can utilize two or more than two quantities, or dimensions, in connection with assigning priority. The data is provided to a processor, and the processor then performs further processing (e.g., based on the assigned priority) and transmits such data to one or more receivers.

Sometimes the delivery of data and messages is described herein and illustrated schematically as though one message/file is dispatched at a time. While that is often the case, the more general case is one or more concurrent channels (e.g., multiple TCP/IP sessions over the same network connection) are utilized. For example, one channel could be provided for small messages and one channel could be provided for large messages. Alternatively, four channels can be utilized with one channel for each quadrant of the 2×2 matrix (see below).

TABLE I

|  | Importance Low | Importance High |
|---|---|---|
| Urgency High | Time/Event is near, but the consequence of not performing the action is not significant. Action must be performed without further delay. | Time/Event is near, and consequence of not performing the action is very significant. Action must be performed without further delay. |
| Urgency Low | Time/Event is not near. Delay is permitted. Consequence of not performing the action is not significant. | Time/Event is not near. Delay is permitted. But the consequence of not performing the action is very significant. |

In a qualitative sense, with a two dimensional vector of urgency and importance on a two dimensional grid, messages and files can be assigned priority within four quadrants, as illustrated in the above Table I. It is helpful in this 2×2 example to give names to the quadrants to express the business value of data classified into these quadrants. The high importance/high urgency quadrant can be referred to as the "highest priority". The high importance/low urgency quadrant can be referred to as the "time sensitive" quadrant. The low importance/high urgency quadrant can be referred to as the "immediate or not at all" quadrant. The low importance/low urgency quadrant can be referred to as the "opportunistic" quadrant.

Referring still to Table I, the highest priority could be assigned, for example, to the highest importance and highest urgency messages/files. Of course, which quadrant has the highest priority messages/files can be selected by the user, and in the example given, the highest priority is assigned to the "high/high" quadrant. The highest priority could, alternatively be assigned to a different quadrant depending on the particular application, and such priority can be assigned using a rule based system.

The next-highest priority could be assigned, for example, to the highest importance/lowest urgency quadrant. This would be a good choice, for example, when constraints in the communications infrastructure lead to these data requiring the next highest priority treatment to ensure delivery and processing.

An alternative choice would be to instead assign the next-highest priority to the lowest importance/highest urgency quadrant. This would be a good choice, for example, when this data supports important low-latency applications such as voice-over-IP.

Data that is deemed high importance but low urgency may imply that delivery or processing should occur before a certain point in time, or prior to a specific upcoming event. Sometimes these are referred to herein as "time sensitive" messages/files. An example is when data files have to be delivered from the ground producer to the aircraft consumer prior to aircraft departure. Another example is when the aircraft is on descent, but is currently above 10,000 feet. Upon descending below 10,000 feet, some broadband satellite communications systems are no longer available for sending and receiving data. This can be used as an important event that helps determine the urgency of data waiting to be sent to from airplane senders to ground receivers. Yet another example is the need to deliver files prior to the aircraft being powered-down and loosing communications. The point in time before which messages/data have to be delivered is sometimes referred to herein as "expiration" time. Rather than expiration time, other temporal information can be used, such as a deadline. Expiration time, deadline, and upcoming events are all examples of the temporal dimension that makes up urgency.

With time sensitive messages/files, as the expiration time or event approaches, there is a mechanism to increase the message/file urgency. Such mechanism is sometimes referred to herein as "dynamic reprioritization". Dynamic reprioritization allows important data to be initially classified with low urgency and hence lower priority, so that other higher-priority data can be processed ahead of it, or so that it can be transmitted over a more suitable and lower cost transmission channel that is expected to be available in the future. At the same time, dynamic reprioritization ensures that as the event or expiration time or deadline nears, and the data has still not been transmitted or processed, its urgency is increased, and hence its priority is increased. This increases the likelihood of successful transmission or processing prior to the event, expiration time or deadline. Overall, dynamic reprioritization helps ensure an efficient use of the constrained communications or processing resources, and further allows transmission of data using the most suitable (e.g., lowest cost) communications links while still meeting delivery requirements.

With the "immediate or not at all" quadrant, messages have to be delivered before the information represented in the message/file deteriorates. As an example, weather updates can be transmitted to the flight deck from ground at 5 minute intervals. Such message can be considered low in importance because, if missed, there is another update in 5 minutes. The information only has value for 5 minutes after which it becomes "stale". As such, such message should be delivered quickly or not at all, and is assigned a high urgency.

With the opportunistic quadrant, this is the combination of the lowest importance and lowest urgency messages/files. These types of messages/files only get a chance at delivery when all other traffic has been transmitted.

Although illustrated as a 2×2 matrix, in a more general case, the quadrant is an N×N matrix or an N×M matrix. The size of the matrix selected depends, for example, on the requirements of a particular application as well as the number of variables involved. In the general case of multiple levels of urgency and importance in an N×M implementation, the next-highest priority would likely be one of the cells next to the high/high cell.

FIG. 4 illustrates rules in connection with an example priority determination. The example prioritization, which translates in this example to a dispatch order, is rules driven, and such rules are selected to meet a particular application's needs and system administrator needs. As shown in the example illustrated in FIG. 4, small messages are handled differently than large messages, and the messages are assigned priority based on the qualitative "low" and "high" categories, and based on urgency and importance.

In this example, messages/files are dispatched one at a time and therefore, the two dimensional values are mapped into a single priority value for dispatch purposes. Such mapping can be performed in many different ways, and such mapping may depend on a particular application. There is an additional challenge when handling a mix of data sizes within the same system. In order to meet the needs of the highest urgency data, and in this example there is a mechanism to prevent larger data that is currently being dispatched or processed from blocking the dispatch or processing system from dispatching or processing newer data (e.g., newly produced or arrived) soon enough to meet the newer data's urgency requirement. For example, if a 1 MB file is being transmitted over a communications link at a rate of 100 kbytes per second, it would take at least 10 seconds to complete the data transfer. Newly arriving data with an urgency requirement to be transmitted within 1 second requires that the transmission of the larger data file be paused, terminated, interleaved or in some other way managed so that the new high-urgency data could be transmitted within its 1 second requirement. In one particular example, large messages are segmented, and then these segmented messages carry the urgency and importance values assigned to the original larger message. This facilitates assignment of priority to the various urgency and importance combinations, of which there are now two sets: one for the small messages and one for the large-message segments. Specifically, messages are categorized as either small or large. Examples of small and large message attributes in AGSC are set forth below.

Attributes of small messages.
Marginal resource (eg bandwidth) consumption of almost zero, or
Marginal cost for using resource of almost zero, or
Does not block the communications link, hence no need to interrupt the transmission of one of lower priority for one of higher priority.

Attributes of large messages.
Significant resource consumption (eg, transmission time), or
Measurable cost, or
Interleaving or interrupting required to prevent the blocking of the communications link, so that the urgency/latency needs of other messages can be met.

In the example, and once the messages are divided between small and large messages, small and large messages are treated concurrently since there is no intrinsic way to know that small high importance messages are of higher importance than large, high importance messages. Therefore, large messages are segmented and the segments are interleaved with small messages.

In addition, there are multiple possible communications paths that can be used for moving data between an aircraft and the ground. Each path has unique characteristics. For example, the cost to send a message varies by path as well as the size of the message. The bandwidth available for sending message also varies by path.

Figure 5:
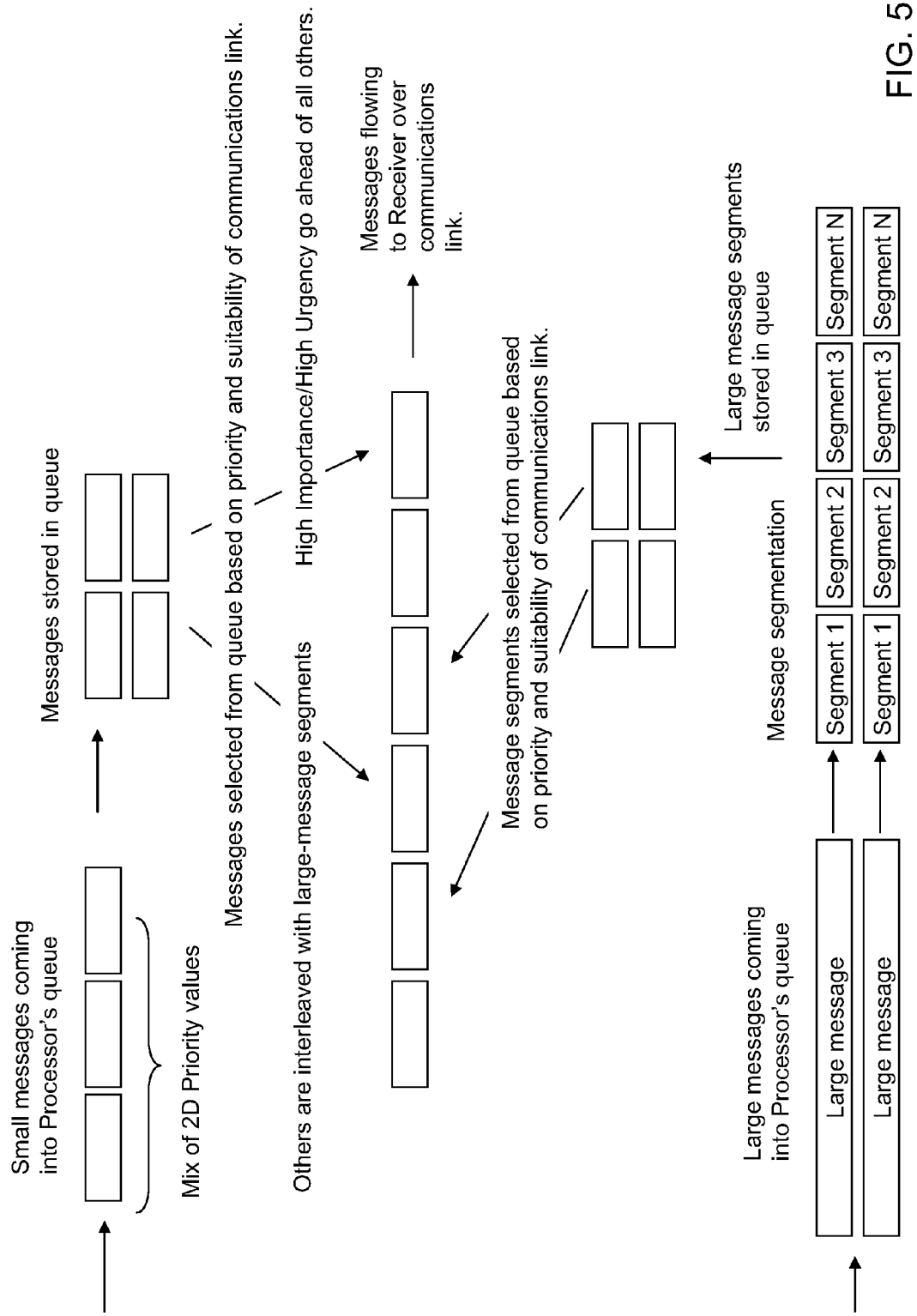
FIG. 5 illustrates segmentation of large messages, and interleaving of the large message segments with small messages, based on priority.

Once prioritized, segments of large messages may be interleaved with small messages for transmission. An example of such interleaving is illustrated in FIG. 5. Specifically, as shown in FIG. 5, small messages are stored into the small message queue. Similarly, large messages are segmented and such segments are stored in the large message segment queue. The small messages are then selected from the small message queue, based on priority, and interleaved with large message segments. The high urgency/high importance small messages are the highest priority in the example shown. Of course, many other techniques are possible and FIG. 5 illustrates just one example of segmenting large messages and interleaving small messages within such segments.

In one particular application, the values of urgency/importance are assigned to each outgoing message, with the system applying system-wide rules to modify or limit these assignments. As an example, there may be administrator rules that restrict the use of high priority/high urgency to a specific producing application. Also, one sender may inflate its message priorities while another understates priorities. Administrator rules can normalize these values. Further, when traffic for multiple airlines and/or multiple airplanes share the same communications channel, administrator rules can be used to normalize the values.

Figure 6:
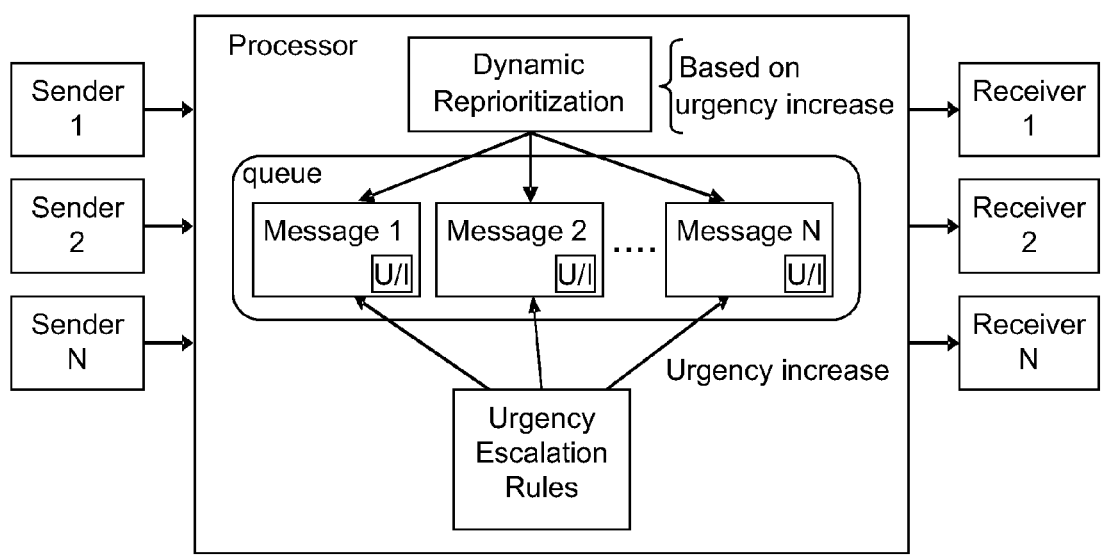
FIG. 6 illustrates dynamic reprioritization.

As shown in FIG. 6, with dynamic reprioritization, and for time sensitive messages/files, as the expiration time or event nears, the system automatically increases the urgency level of the message/file. As a result, such a message/file is assigned a higher urgency, such that it has a higher chance of being processed, e.g., dispatched, relative to other messages/files. In a sense, dynamic reprioritization allows important data to be classified as low urgency with a deadline, and is especially applicable in connection with transmission of data when the cost of different communications channels is considered.

As an example, a large message with low urgency may be best delivered when the aircraft is parked at an airport gate, using the high-bandwidth and zero marginal cost wireless connection. If that delivery opportunity is not available, as the expiration time nears, the system is willing to incur an even higher cost for delivery of the message. Instead of explicitly dealing with this cost aspect, message urgency is increased instead, and the system responds accordingly by moving the message ahead of other messages of lower urgency, and also utilizes available communication paths to deliver the message, even if such paths are more expensive than the wireless connection at the gate.

Referring now specifically to communications between an airplane and ground systems, such communications can follow a number of different patterns. Two general cases are messaging and file transfer. With messaging, communications can occur in an occasionally connected or occasionally disconnected environment in which an airplane operates. That is, the airplane has communication to the ground at various points during its operational cycle (ground, ascent, cruise, descent, hanger, terminal), and in the general case does not have continuous communication with ground. The ability of the airplane to use an available communication path depends on, among other things, its phase of flight. In the context of messaging, the processor may utilize urgency and importance to determine a dispatch path and order.

With AGSC, having loose coupling between the various applications/systems that need to communicate with each other provides a number of advantages. For example, each application/system can dispatch data when ready, and consume data when available, and perform other tasks between dispatching and consuming.

In addition, having each function perform its role while "abstracted" from underlying functions relied upon for support provides advantages. For example, each ground based application performs its role without having to be concerned about the details of data reaching its destination on the airplane, or even whether the airplane is connected at the time, or reachable over the network. Such advantages also exist for communication from the air to ground as well. Each application can operate without knowing whether the network between the ground and the airplane is operational end-to-end.

In a complex environment, a high volume of messages are produced that originate from many different applications. Message traffic flows from multiple airplanes to ground and ground to air, and there are multiple applications onboard each airplane participating in messaging. Air/ground message traffic requires managing messages in an occasionally disconnected environment. On the ground, messages are queued up for dispatching to airplanes until those planes are reachable, and then the messages are dispatched accordingly. The same is true for messages from the airplanes to ground.

Figure 7:
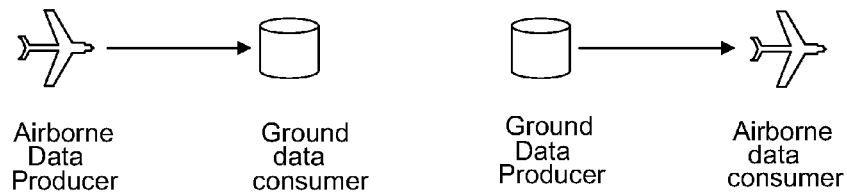
FIG. 7 illustrates one-way AGSC patterns.
Figure 8:
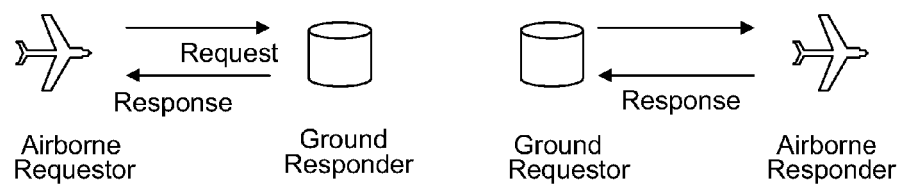
FIG. 8 illustrates request/response, or data exchange, AGSC patterns.
Figure 9:
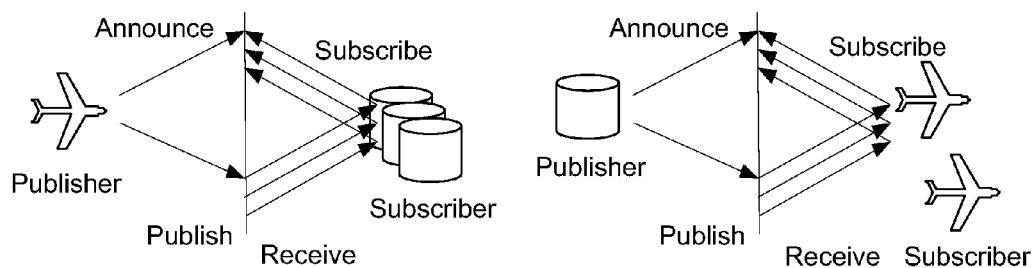
FIG. 9 illustrates publish/subscribe AGSC patterns.

There are multiple different patterns for communications, and examples of such communication patterns are illustrated in FIGS. 7, 8, and 9. Of course, there are other complex patterns not shown. By way of example, FIG. 7 illustrates one-way communications between an airborne data producer and ground data consumer, as well as between a ground data producer and an airborne data consumer.

FIG. 8 illustrates request/response, or data exchange, communications. The requestor can be airborne or a ground system, and the responder can be a ground or airborne system. There is no implication that the response is immediate. Formation and dispatching of the response may require an event to occur or gathering of data prior to the response being generated.

FIG. 9 illustrates publish/subscribe communications. As shown in FIG. 9, an airborne system can publish messages to multiple ground subscribers, and a single publisher can publish to multiple airborne subscribers. The publish/subscribe path generally assumes a subscription/publication management function providing directory services so that the subscriber can locate and sign up to receive the published data, and a publication management function to transmit the data to the subscribers.

The prioritization described herein is particularly useful in at least the following areas with respect to AGSC: situations where choices have to be made about delivering the data, situations where choices have to be made about consuming data, situations where data is selectively subscribed to based on delivery or processing constraints, and situations where the participating applications can use two dimensions to describe their needs to each other.

With respect to situations where choices have to be made about delivering the data, the producer determines, based on the business process being executed, the urgency and importance of the data, and assigns the 2D descriptor values accordingly. This enables the delivery system to optimize decisions regarding data delivery with either constrained resources, or with alternative delivery paths, or both. In a request response pattern, the requestor determines, based on the business process it's accomplishing, the urgency and importance of the data it requires; makes its request to the responder, passing to it the 2D descriptor values as part of its request. The responder then generates its response, and assigns a 2D descriptor to it, either applying what the requestor requested or making modifications. This enables the delivery system to optimize decisions regarding data delivery.

For situations where choices have to be made about consuming data, when the onboard consumer (or subscriber) has constrained resources, the onboard consumer (or subscriber) uses the 2D descriptor associated with received data to prioritize its processing. When there exists a separate onboard data management intermediary that receives data prior to forwarding it to the consumer (subscriber), the intermediary can use the 2D descriptor to prioritize the delivery of data to the consumer (subscriber).

For publish/subscribe situations in which data is selectively subscribed to based on delivery or processing constraints, each recipient (e.g., airplane) has different needs. For example, each airplane determines how it can consume or wants to consume weather data being continuously streamed as messages. The ground applications need not know anything about the onboard receiving or processing capabilities or business needs supported by the weather data. In this case, the 2D descriptor is provided by the airplane (the subscriber) to the subscription/publication management function (located in the ground infrastructure) so that in place of a binary "subscribe" or "don't subscribe" decision, data is instead prioritized as required by the consumers on the airplane to meet the business needs of these consumers. Instead of a static pattern, prioritizations can then be potentially changed to meet business needs which themselves change based on phase of flight.

For situations where the participating applications can use 2D to describe their needs to one another, and when applications are involved in executing a complex business process that requires a series of back and forth sharing of data (sometimes referred to as "choreography"), the applications can use the 2D descriptor not for describing the priority of the data to get around constraints, but rather to describe to the other participating applications when they need the data and the importance of the data. For example, a participating system can decide whether to do minimal processing and deliver a rough-estimate response, or take the time for a refined response. An example is an application that performs complex image processing, such as image compression. When images are sent to the application for processing, the application can compress the image in successively refined steps, with an intermediate output available from each step, if desired. A requesting application can request that an image be compressed urgently, but that an intermediate result is acceptable, with the final compressed imaged needed later. Such 2D descriptor also can be used to adjust its own internal business process if necessary to meet the importance and urgency needed by the requestor. Using the image compression example, an application may queue-up requests and then process the requests one at a time, and use the importance and urgency values to determine queue order. Or, using the same example, in a multi-tasking or multi-threaded processor, it can assign processing power to the image compression task depending on the urgency and importance attached to the request. Also, an application can generate a response, and assign the 2D values as requested by the requestor, to ensure the response is dispatched as needed to meet the requestor's needs.

The following discussion relates to constraints in the delivery chain, alternatives in the delivery chain, and constraints with an onboard receiver. With respect to constrains in the delivery chain, assigning a priority has particular value when patterns are applied to data delivery situations with constrained resources, namely, constrained capacity in the communications path. In one respect, constrained capacity can be defined as bandwidth multiplied by time, meaning that there are bandwidth as well as delivery window constraints (e.g., 15 minutes remain before the aircraft pulls away from the gate and loses its high-bandwidth airport wireless connection; 10 minutes remain before the aircraft descends to below 10,000 feet and loses its broadband satellite connection).

Figure 10:
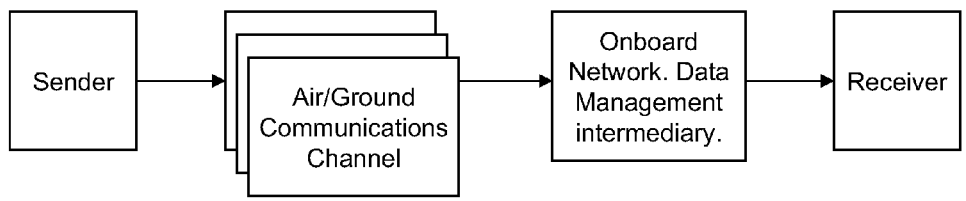
FIG. 10 is a schematic illustration of an AGSC system.

With respect to alternative delivery paths in the delivery chain, FIG. 10 illustrates such alternative paths. A sender can transmit data via multiple different paths, or channels, to an onboard intermediary. As used herein, the term "intermediary" refers to a communications management processor, which could be or include an onboard message management function. The onboard intermediary then transmits to a receiver. Each path has different characteristics that affect the success, quality and cost of the delivery of the data. The paths do not necessarily have to be constrained resource, just alternatives with different costs and other attributes. Attributes include the channels' ability to support large files/messages, or ability to support encrypted data, reliability, or other characteristics. The 2D processing can be used to optimize queuing. With delivery alternatives, the urgency attribute, or parameter can be further leveraged to choose to not deliver on the currently available channel and wait for an alternative channel.

With respect to constraints with the onboard receiver, the costs and effort required to certify new hardware for use onboard results in the hardware having a long lifetime. Therefore, such hardware will fall behind the state of the art in technology, resulting in limited CPU, RAM and HDD capacity relative to the ground systems. Other constraints include thermal dissipation and power consumption which limit CPU capability upfront. Software upgradeability is limited because onboard software is treated as a controlled part, and changing the software invokes the same issues and similar processes as encountered with making engineering changes to physical parts.

Referring to FIG. 10, by combining constrained delivery paths, alternative delivery paths, and constraints on the onboard receiver, the general situation is that the AGSC communications channels, the onboard network data management intermediary, and the onboard receiver are each a constrained resource. In practice, there are multiple senders, sending multiple messages and files, over a number of communication paths, to a number of receivers, on a multitude of airplanes, concurrently. Such communications are happening bi-directionally.

Figure 11:
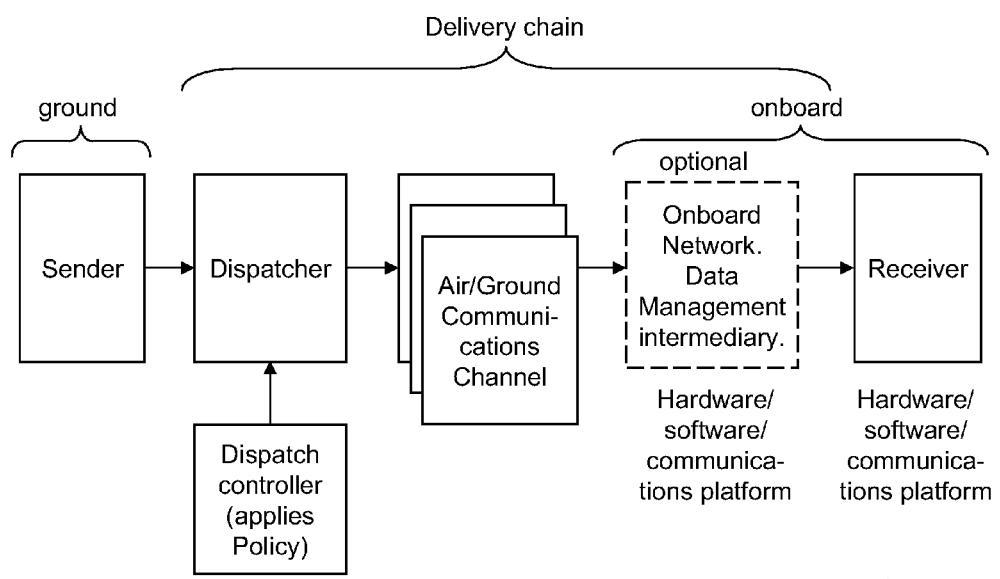
FIG. 11 is a schematic illustration of a delivery chain for one-way ground-to-air communications using an AGSC system.

FIG. 11 illustrates a single data exchange in AGSC, representing a one-way exchange, or one part of a more complex exchange such as request response, in the ground to air direction. The AGSC communications channels, the onboard network data management intermediary, and the receiver are constrained resources. The sender is any one of the producer, requester, responder, and publisher depending on the pattern. The receiver is any one of the consumer, responder or subscriber.

Still referring to FIG. 11, and for AGSC in the ground to air direction, the producer application determines urgency and importance to support business needs. The 2D descriptor is used for dispatch decision making in the context of alternative, constrained delivery channels. The 2D descriptor is generated at the sender, either as a message header or file meta data. The dispatcher, under control of a dispatch controller that controls the dispatcher in accordance with pre-defined policy, uses the descriptor to make dispatch decisions. The 2D descriptor can be transmitted on the channel, optionally, as part of the data.

With onboard constraints, the 2D descriptor can be used by the onboard network data management intermediary for dispatching data to the receiver. The 2D descriptor can remain part of the message, and the receiver can make processing priority decisions based on the 2D descriptor.

Figure 12:
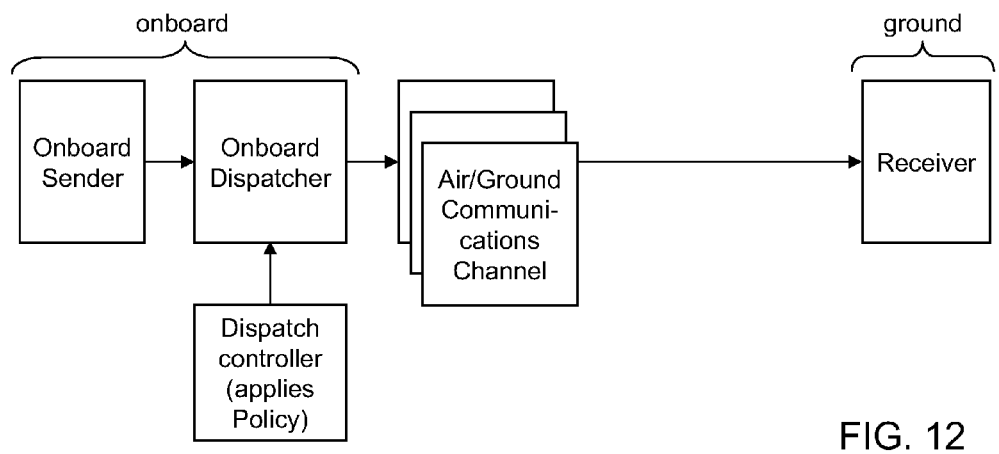
FIG. 12 is a schematic illustration of a delivery chain for one-way air-to-ground communications using an AGSC system.

FIG. 12 illustrates AGSC with one-way delivery in the air to ground direction. Generally, the 2D descriptor is generated by the onboard sender and is used by the onboard dispatcher to make dispatch decisions. The 2D descriptor optionally is transmitted as part of the data.

Figure 13:
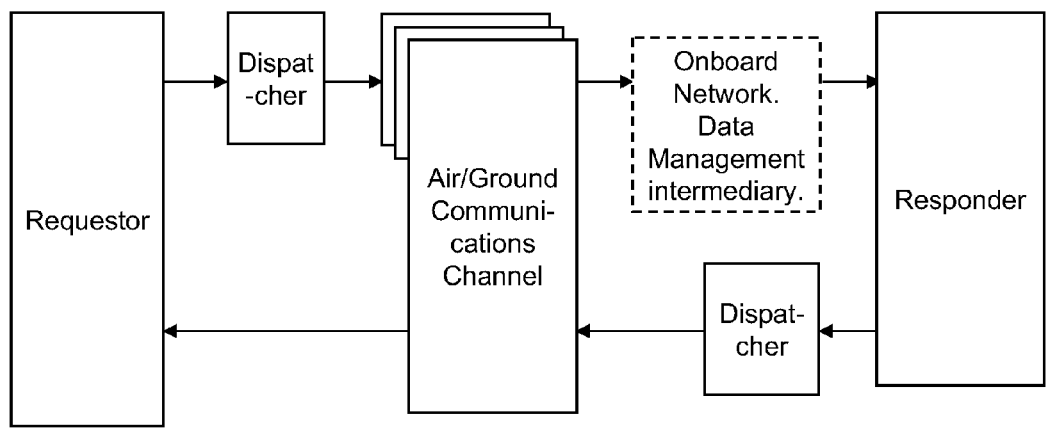
FIG. 13 is a schematic illustration of a request/respond delivery chain for ground-to-air communications.

Referring to FIG. 13, the request/response pattern is shown for the ground to air direction. This pattern also applies in the reverse for the air to ground direction. As shown in FIG. 13, the requester determines the urgency and importance that it needs in the response, and communicates that to the responder. The 2D descriptor for response can be embedded within the request. The dispatch decision from the dispatcher is based on the 2D descriptor for the request. The 2D descriptor for response is carried through to the responder. The responder assigns a 2D descriptor as requested in the request. The 2D descriptor may be identical to the 2D descriptor that was passed to it form the requester or may be modified by the responder. The dispatch decision from the responder is based in part on the 2D descriptor, and such descriptor is optionally part of the data.

Figure 14:
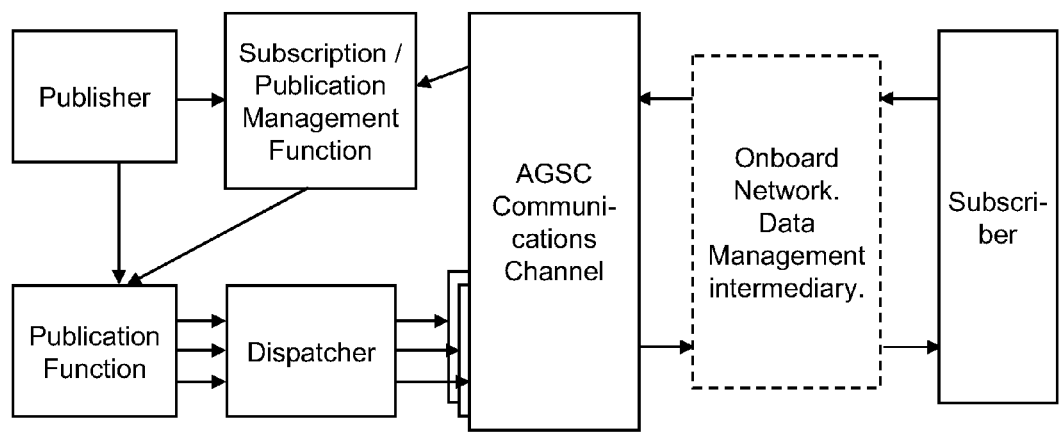
FIG. 14 is a schematic illustration of a publish/subscribe delivery chain in which the subscriber is airborne.

FIG. 14 illustrates the publish/subscribe path with the subscriber airborne. In this example, the subscriber generates the 2D descriptor for attachment to the data being subscribed to. This pattern also applies whether or not an outbound 2D descriptor is used.

Generally, the subscriber generates a 2D descriptor for use with its subscription and attaches such 2D descriptor to a subscription request. The onboard intermediary makes a dispatch decision based in part on the 2D descriptor and transmits such request, with the 2D descriptor embedded therein, via the communications channel to the subscription/publication management function. The subscription/publication management function transmits such request, with the 2D descriptor embedded therein, to the publication function.

At the time of publication, the data to be published is transmitted from the publisher to the publication function. The publication function transmits the data to the dispatcher, with a 2D descriptor contained in the data header. The dispatcher makes its dispatch decision based in part on the 2D descriptor. The data is transmitted over an AGSC channel to the onboard network intermediary, and then from the intermediary to the subscriber. The data is received by the subscriber with the appropriate urgency and importance to suit the subscriber's needs.

Figure 15:
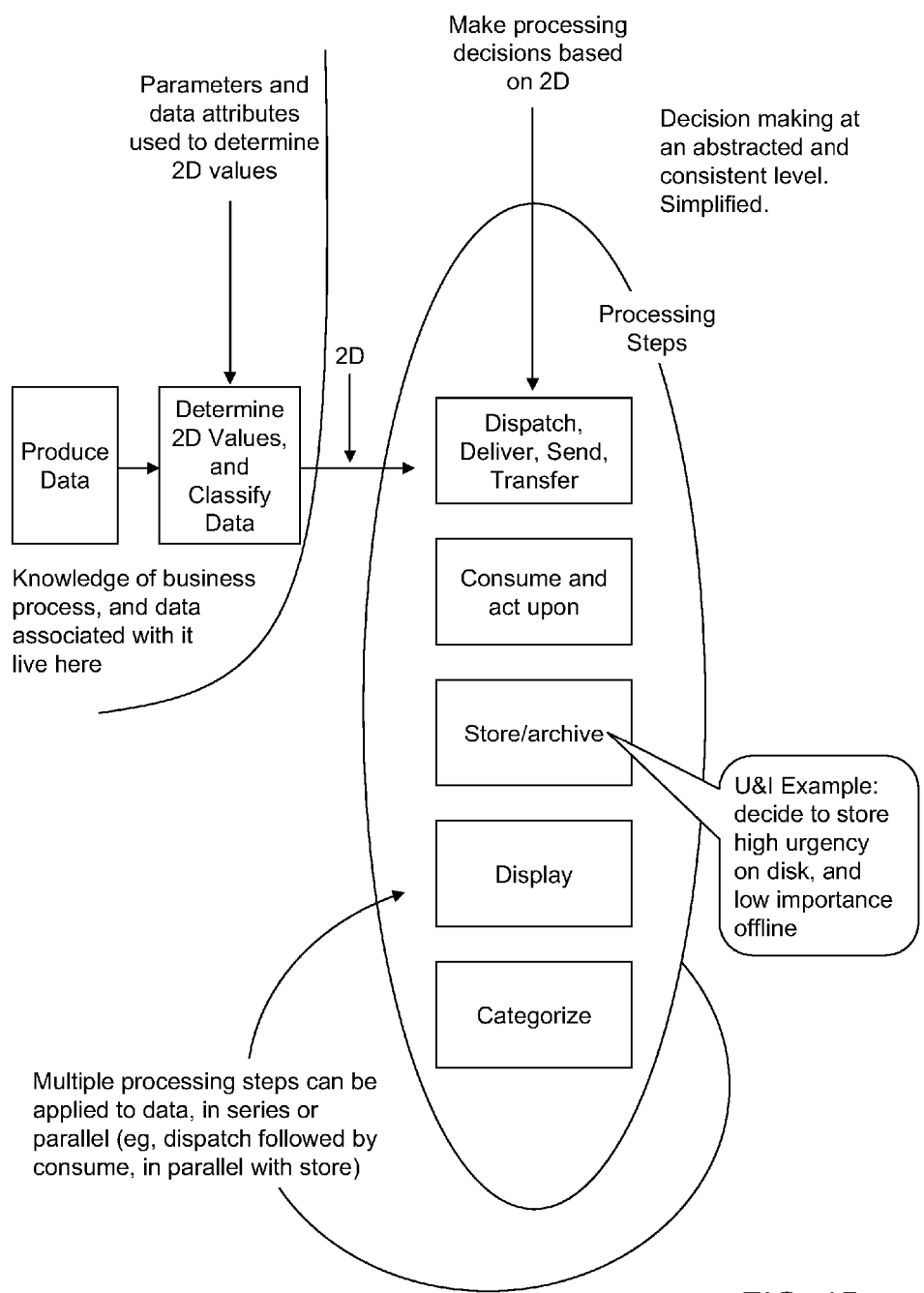
FIG. 15 illustrates two dimensional priority in a general case.

FIG. 15 illustrates two dimensional priority in a general case. As illustrated in FIG. 15, once the data is produced, the 2D priority values are determined based on parameters and attributes of the data itself, and the data is classified accordingly. Further processing decisions are then made based on the 2D values. Such processing steps include, for example, dispatch, deliver, send, and transfer. In addition, the data can be consumed and acted upon, stored/archived, displayed, and/or categorized. As an example, high urgency data could be stored on disk, and low importance data could be stored offline. Multiple processing steps can be applied to data, in series or in parallel (e.g., dispatch followed by consume, in parallel with store).

Figure 16:
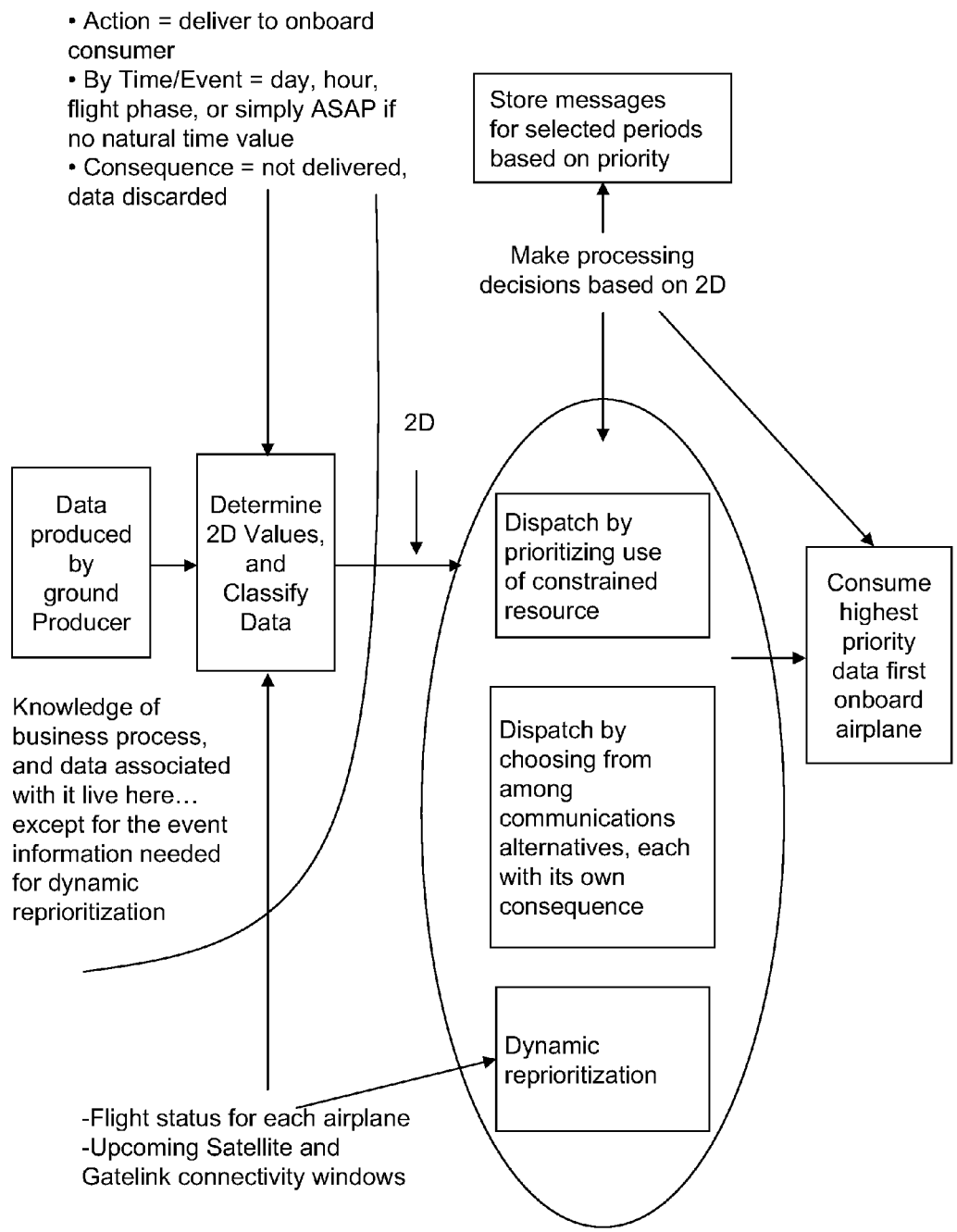
FIG. 16 illustrates two dimensional priority in a specific air/ground case.

FIG. 16 illustrates two dimensional priority in a specific air/ground case. As illustrated in FIG. 16, once the data is produced, the data is classified based on parameters and data attributes used to determine 2D values. For example, an action (e.g., deliver to onboard consumer) can be utilized in determining priority, as well as time/event (e.g., day, hour, phase of flight, or simply ASAP if the data has no natural time value) and consequence (e.g., data not delivered, data discarded). Dynamic reprioritization also can be utilized as described previously. Further processing decisions are then made based on the 2D values. Such processing steps include, for example, dispatch by prioritizing use of constrained resource (e.g., consume highest priority data first onboard airplane), dispatch by choosing from among communications alternatives, each with its own consequence, and dynamic reprioritization (e.g., based on flight status of each airplane, upcoming satellite and airport wireless connectivity windows (airport wireless refers to the common communication channel utilized between an airplane and ground systems when the airplane is at an airport). In addition, messages could be stored for selected periods based on priority.

Figure 17:
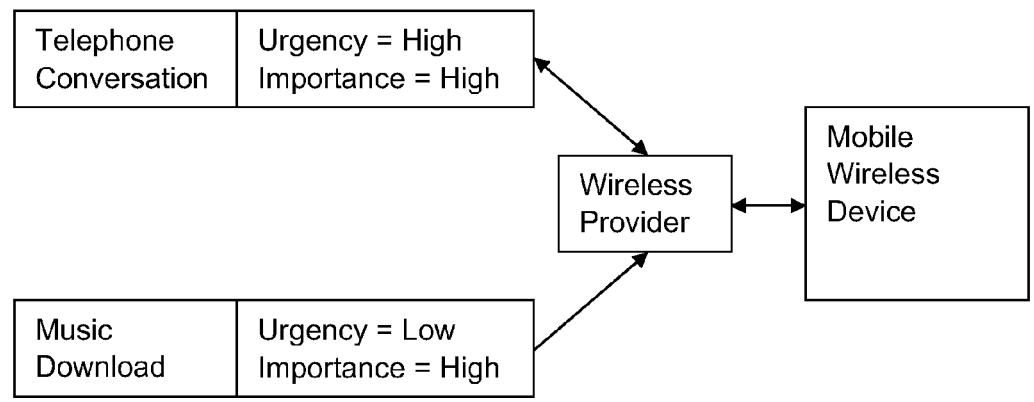
FIG. 17 illustrates multiple concurrent exchanges of data or communications.

FIG. 17 illustrates multiple concurrent exchanges of data or communications. As shown in FIG. 17, multiple providers can send data to a mobile recipient, shown here as a generic mobile wireless device. The low urgency music download does not interrupt the data stream which carries the high urgency telephone conversation; however during pauses in the telephone conversation music download data can be interleaved. Once the telephone conversation is concluded, the music download can proceed uninterrupted. If another telephone conversation is initiated before the completion of the music download, that conversation interrupts the music download. As the expiration date/time of the music download approaches, the urgency increases, allowing a dynamic reprioritization of music to be equal to a phone conversation, at which point the cellular recipient would receive a call-waiting notification and decide to continue the conversation or complete the music download.

As another example with a mobile device, a pre-recorded reading of a book (a "book on tape") is being downloaded to the mobile device. Chapters 3 and 4 of the book are desired. While both chapters are important, Chapter 3 is of higher urgency with the disconnection of the mobile device from the network looming, so Chapter 3 moves up higher in urgency and Chapter 4 lags in the queue.

In the examples set forth above, the variables of urgency and importance are utilized. Of course, the variables utilized are not limited to urgency and importance, and other variables, including variables in addition to urgency and/or importance, can be utilized.

Figure 18:
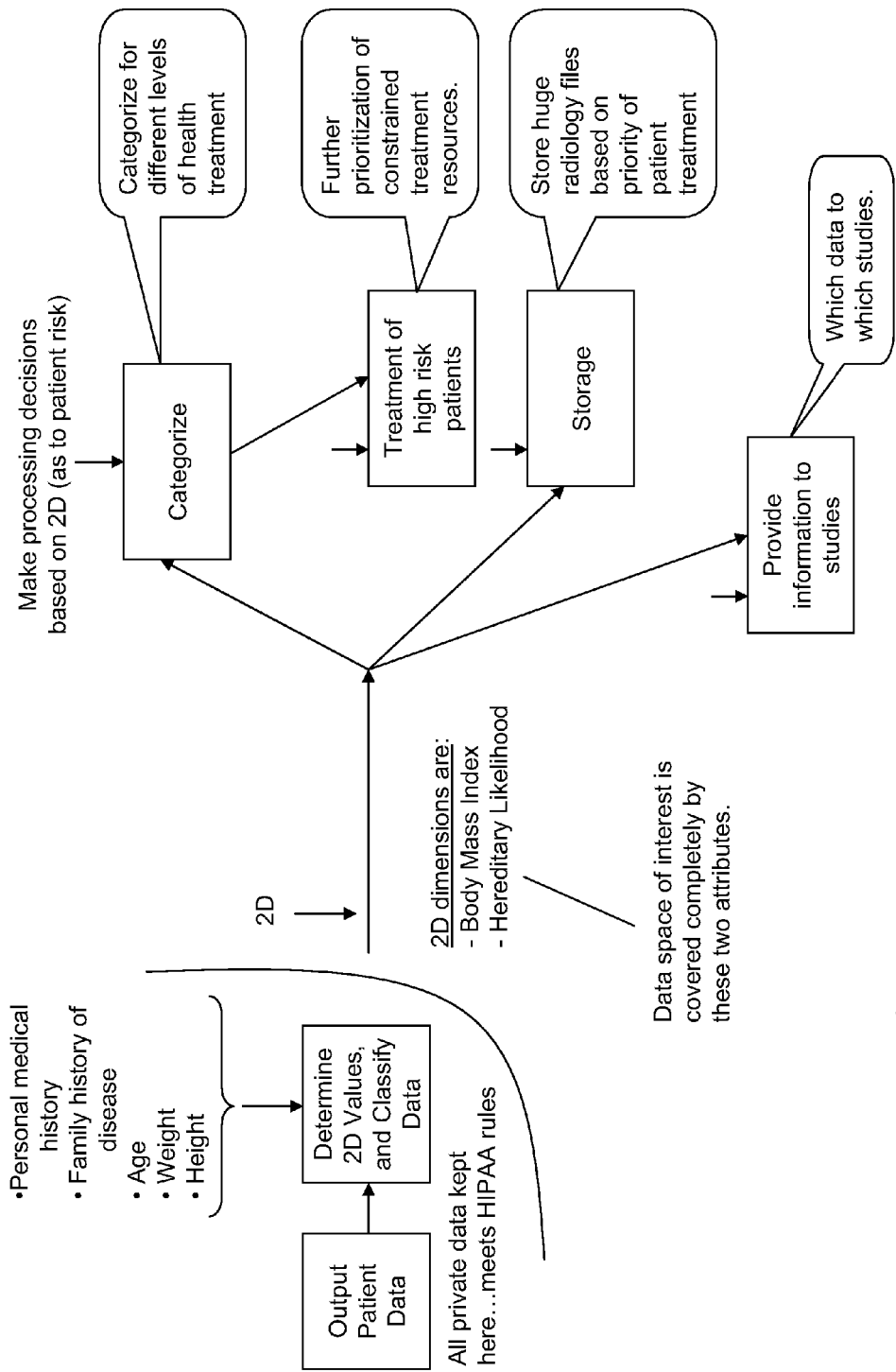
FIG. 18 illustrates two dimensional priority in a specific medical screening and study case.

FIG. 18 illustrates two dimensional priority in a theoretical medical screening and study case. As shown in FIG. 18, data is classified in the case based on personal medical history, family history of disease, age, weight, and height. The 2D priority is determined based on body mass index and hereditary likelihood. In this example, the data space of interest is completely covered by these two attributes. Further processing decisions (e.g., as to patient risk) are then made using the 2D priority. For example, such processing can include categories of different levels of treatment, prioritization of high risk patients based on constrained resources, storage of radiology files based on patient treatment, and providing information for studies (e.g., identify the particular data to be provided for specific studies).

Figure 19:
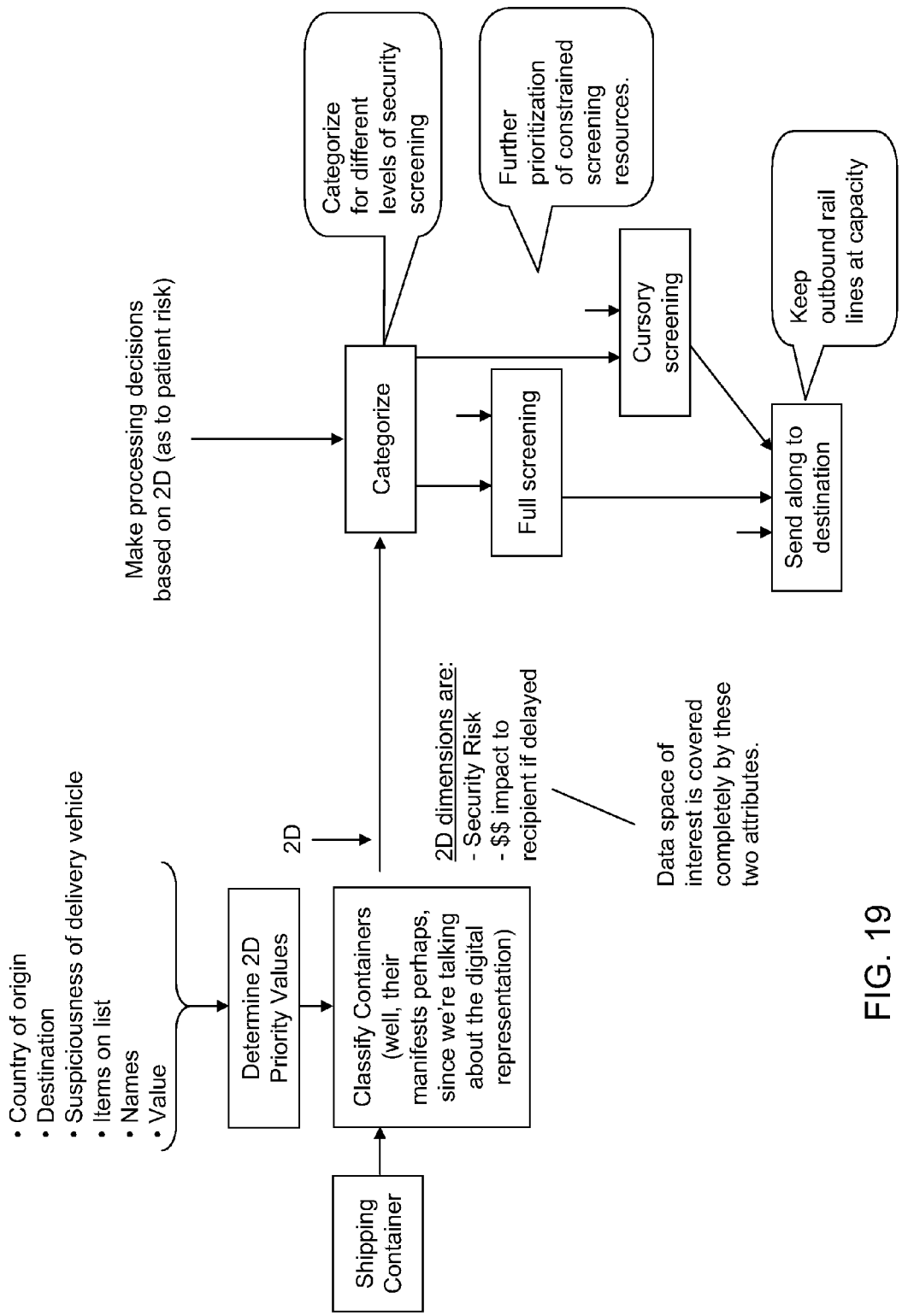
FIG. 19 illustrates two dimensional priority in a homeland security container screening case.

FIG. 19 illustrates two dimensional priority in a homeland security container screening case. As shown in FIG. 19, data is classified based on country of origin, destination, suspiciousness of delivery vehicle, items on list, names, and values of the goods. The 2D priority is then determined based on security risk and the economic impact to recipient of delivery of the container is delayed. In this example, the data space of interest is completely covered by these two attributes. Further processing decisions (as to risk) can then be made using the 2D priority. For example, such processing can include categorizing different levels of security screening (e.g., full screening, cursory screening). In addition, such processing can include when to provide such containers for delivery to a particular destination, e.g., to keep outbound rail lines at capacity.

The above described systems and methods facilitate reliable execution of business processes with constrained or alternative resources. In addition, such systems and methods facilitate overall lower costs for data delivery and also facilitate reduced infrastructure costs due to maximal utilization. Further, increased usage of constrained resources is facilitated through level loading using the urgency attribute. Also, even delivery of large important files can be deferred using the systems and methods since such files can be delivered using lower cost off hours opportunities.

While the invention has been described in terms of various specific embodiments, those skilled in the art will recognize that the invention can be practiced with modification within the spirit and scope of the claims.

What is claimed is:

1. A system for aircraft/ground systems communications, comprising:
   a processor based onboard the aircraft,
   a ground based processor, and
   a plurality of communication links between said onboard processor and said ground based processor, wherein at least one of said onboard processor and said ground based processor is configured to:
   assign an urgency and an importance to a plurality of data packets to be transmitted in a plurality of messages between said onboard processor and said ground based processor, wherein the urgency is assigned based on at least one of: a speed at which a usefulness of the data deteriorates, a speed at which a response to the data is required, a reason that the data should arrive prior to an event, and a time period within which an action needs to occur, and wherein the importance is assigned based on at least one of: a measurement of how the data will alter or enhance a decision, a measurement indicating a degree to which the data will cause an event, and an impact if the data is not delivered;

determine at least one of said plurality of communication links to transmit the plurality of messages to the other of said onboard processor and said ground based processor based on the assigned urgency of the data packets, the assigned importance of the data packets, and a size of the data packets;

interleave the various data packets within the plurality of messages based on the assigned urgency, the assigned importance of the data packets, and the size of the data packets prior to transmitting the messages to the other of said onboard processor and said ground based processor; and dynamically reprioritize at least one of the urgency and the importance of the data in the data packets over time from an initial urgency and an initial importance assigned by at least one of said processors to a reprioritized urgency and reprioritized importance.

2. A system according to claim 1 wherein at least one of said processors is further configured to assign a priority to the data based on the assigned urgency and importance.

3. A system according to claim 2 wherein a highest importance and highest urgency data has a highest priority.

4. A system according to claim 1 wherein the assigned urgency and importance, and therefore the priority assigned to the data packets can change over time, causing the at least one of said onboard processor and said ground based processor to update the interleaving of the various data packets within the plurality of messages.

5. A system according to claim 1 comprising further processing the data based on the assigned urgency and importance.

6. A system according to claim 1 wherein to interleave the various data packets within the messages said system is configured to interleave small messages with segments of large messages.

7. A system according to claim 6 wherein to interleave small messages with segments of large messages, said further processing comprises at least one of pausing transmission of at least one segment of the data, interleaving transmission of at least one segment of the data with another segment of the data, and resuming transmission of at least one segment of the data.

8. A system, comprising:
a memory for storing data, and
a processor coupled to said memory, said processor configured to assign an urgency and an importance to data, and process messages containing the data based on the assigned urgency and importance assigned to the data within the messages, wherein the urgency is assigned based on at least one of: a speed at which a usefulness of the data deteriorates, a speed at which a response to the data is required, a reason that the data should arrive prior to an event, and a time period within which an action needs to occur, and wherein the importance is assigned based on at least one of: a measurement of how the data will alter or enhance a decision, a measurement indicating a degree to which the data will cause an event, and an impact if the data is not delivered, the processing comprising determining at least one of a plurality of communication links between said processor and another processor to transmit the messages based on the assigned urgency of the data, the assigned importance of the data, and a size of the data, and interleaving small messages with segments of large messages based on the assigned urgency, the assigned importance, and the size of the data, said processor further configured to dynamically reprioritize at least one of the urgency and the importance of the data over time from an initial urgency and an initial importance assigned by said processor to a reprioritized urgency and reprioritized importance.

9. A system according to claim 8 further comprising a processor for further processing the data based on the assigned urgency and importance.

10. A system according to claim 9 where said further processing comprises assigning a priority to the data based on the assigned urgency and importance.

11. A system according to claim 10 wherein a highest importance and highest urgency data has a highest priority.

12. A system according to claim 10 wherein the priority changes over time.

13. A system according to claim 9 wherein said further processing comprises at least one of pausing transmission of at least one segment of the data, interleaving transmission of at least one segment of the data with another segment of the data, and resuming transmission of at least one segment of the data.

14. A system according to claim 8 wherein data is assigned at least one of an initial urgency and an initial importance, and wherein at least one of the initial urgency and the initial importance of the data changes over time.

15. A method for processing various data for transmission, said method comprising the steps of:
assigning an initial urgency and an initial importance to each of the various data, wherein the urgency is assigned based on at least one of: a speed at which a usefulness of the various data deteriorates, a speed at which a response to the various data is required, a reason that the various data should arrive prior to an event, and a time period within which an action needs to occur, and wherein the importance is assigned based on at least one of: a measurement of how the various data will alter or enhance a decision, a measurement indicating a degree to which the various data will cause an event, and an impact if the various data is not delivered,
further processing the various data based on the assigned initial urgency, the assigned initial importance, and a size of the various data, wherein at least one of the initial urgency and the initial importance of the various data is dynamically reprioritized over time,
determining at least one of a plurality of communication links between a processor and another processor to transmit the various data based on the reprioritized urgency, the reprioritized importance, and the size of the various data;
dynamically interleaving the various data into messages to be transmitted, the interleaving based on the reprioritization of the urgency and the importance of the various data over time and the size of the various data.

16. A method according to claim 15 wherein the various data is delivered within a network.

17. A method according to claim 16 wherein the network includes a mobile device.

18. A method according to claim 17 wherein the mobile device is an airplane.

19. A method according to claim 15 wherein processing the various data based on the assigned initial urgency and initial importance comprises assigning an initial priority to the data.

20. A method according to claim 19 wherein a highest initial importance and highest initial urgency data has a highest initial priority.

21. A method according to claim 19 wherein the assigned initial urgency and initial importance, and therefore the initial priority changes over time.

22. A method according to claim 15 wherein dynamically interleaving the various data into messages to be transmitted further comprises the step of interleaving small messages with segments of large messages.

23. A method according to claim 15 wherein dynamically interleaving the various data into messages to be transmitted further comprises the step of at least one of pausing transmission of at least one segment of the data, interleaving transmission of at least one segment of the data with another segment of the data, and resuming transmission of at least one segment of the data.

24. A system, comprising:
a memory for storing data,
a processor coupled to said memory, said processor configured to assign at least a first parameter, a second parameter, and a third parameter to the data, to utilize the parameters to assign a priority to the data where the data is dynamically reprioritized over time, and transmit the data to another processor using one of a plurality of communication links between said processor and the other processor determined based on the assigned priority, the data interleaved into messages based upon the dynamic reprioritization of the data by said processor at a time each message is constructed for transmission,
wherein the first parameter is an urgency assigned to the data based on at least one of a speed at which the usefulness of the data deteriorates, a speed at which a response to the data is required, a reason that the data should arrive prior to an event, and a time period within which an action needs to occur,
wherein the second parameter is an importance assigned to the data based on at least one of a measurement of how the data will alter or enhance a decision, a measurement indicating a degree to which the data will cause an event, and an impact if the data is not delivered, and
wherein the third parameter is a size of the data.

25. A system according to claim 24 wherein at least three parameters are assigned to the data.

26. A method according to claim 15 wherein the urgency is assigned based on at least one of a speed at which the usefulness of the various data deteriorates, a speed at which a response to the various data is required, a reason that the various data should arrive prior to an event, and a time period within which an action needs to occur.

27. A system according to claim 24 wherein urgency is assigned based on at least one of a speed at which the usefulness of the data deteriorates, a speed at which a response to the data is required, a reason that the data should arrive prior to an event, and a time period within which an action needs to occur, and wherein importance is assigned based on at least one of a measurement of how the data will alter or enhance a decision, a measurement indicating a degree to which the data will cause an event, and an impact if the data is not delivered.

* * * * *